(12) United States Patent
Andruschuk et al.

(10) Patent No.: US 9,800,584 B1
(45) Date of Patent: *Oct. 24, 2017

(54) HIERARCHICAL POLICY-BASED SHARED RESOURCE ACCESS CONTROL

(71) Applicant: Amazon Technologies, Inc., Seattle, WA (US)

(72) Inventors: Borislav Andruschuk, Mountain View, CA (US); Kevin Fowler, Costa Mesa, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/341,895

(22) Filed: Nov. 2, 2016

Related U.S. Application Data

(63) Continuation of application No. 14/453,368, filed on Aug. 6, 2014, now Pat. No. 9,516,028.

(51) Int. Cl.
*H04L 29/00* (2006.01)
*H04L 29/06* (2006.01)

(52) U.S. Cl.
CPC .......... *H04L 63/101* (2013.01); *H04L 63/104* (2013.01); *H04L 63/20* (2013.01)

(58) Field of Classification Search
CPC ....... H04L 63/10; H04L 63/20; H04L 63/101; G06F 21/10; G06F 21/316; G06F 21/604; G06F 21/6218; G06F 12/0875; G06F 2221/2145; G06F 2221/2101; G06F 2221/2141; G06F 21/104
See application file for complete search history.

(56) References Cited

U.S. PATENT DOCUMENTS 7,523,206 B1* 4/2009 Naish ................... G06F 15/173
709/223
2002/0186260 A1 12/2002 Young
(Continued)

OTHER PUBLICATIONS

Lala, "Secure Content in IIS Through File Systems ACLs," Internet article, Mar. 17, 2009, source: http://www.iis.net/learn/get-started/planning-for-security/secure-content-in-iis-through-file, 7pp.
(Continued)

*Primary Examiner* — Don Zhao
(74) *Attorney, Agent, or Firm* — Klarquist Sparkman, LLP

(57) ABSTRACT

Access control for shared computing resources in a hierarchical system is provided herein. An as-needed, "lazy evaluation" approach to access control is described in which an effective access control list for a computing resource is determined after a request is received from a user to access the resource. When resources are shared, access control policies are created and stored in association with the shared resource but are not stored in association with hierarchically related lower-level resources. When an access request for a resource is received, access control policies are collected for levels of a computing resource hierarchy that are higher than the hierarchy level of the resource. An effective access control list is determined based on permissions specified in the collected access control policies. The effective access control list represents an effective propagation of access control policies of higher hierarchy levels to the computing resource.

20 Claims, 8 Drawing Sheets

(56) References Cited

U.S. PATENT DOCUMENTS

| | | | |
|---|---|---|---|
| 2005/0251508 A1 | 11/2005 | Shimizu | |
| 2006/0277184 A1 | 12/2006 | Faitelson et al. | |
| 2007/0100830 A1* | 5/2007 | Beedubail | G06F 21/604 |
| 2008/0016546 A1 | 1/2008 | Li | |
| 2008/0022370 A1 | 1/2008 | Beedubail et al. | |
| 2010/0281060 A1 | 11/2010 | Ahmed | |
| 2011/0225297 A1* | 9/2011 | Archer | G06F 9/526 709/225 |
| 2012/0136936 A1 | 5/2012 | Quintuna | |
| 2013/0091562 A1 | 4/2013 | Matsuzawa | |
| 2013/0246470 A1 | 9/2013 | Price et al. | |
| 2013/0254536 A1* | 9/2013 | Glover | G06F 21/6209 713/165 |
| 2013/0304917 A1 | 11/2013 | Mittal et al. | |
| 2014/0101434 A1* | 4/2014 | Senthurpandi | G06F 21/32 713/150 |
| 2014/0130180 A1* | 5/2014 | Balasubramanyan | G06F 21/604 726/27 |
| 2015/0127937 A1* | 5/2015 | Ali | G06F 21/6218 713/165 |

OTHER PUBLICATIONS

Yeong, "Lightweight Directory Access Protocol" Request for Comments RFC-1777, Publication Date: Mar. 1995, source: http://www.hjp.at/doc/rfc/rfc1777.html, 23pp.

* cited by examiner

HIERARCHICAL POLICY-BASED SHARED RESOURCE ACCESS CONTROL

CROSS REFERENCE TO RELATED APPLICATION

This application is a Continuation of U.S. patent application Ser. No. 14/453,368, "HIERARCHICAL POLICY-BASED SHARED RESOURCE ACCESS CONTROL," filed on Aug. 6, 2014, which is hereby incorporated by reference in its entirety.

BACKGROUND

Sharing files, folders, and other computing resources among different users typically involves some type of access control or permissions. In conventional systems, when a computing resource is shared with a user, access control policies or permissions indicating that the user is authorized to perform some action are typically established at the level of the resource and propagated down to each hierarchically related lower-level resource. In this way, if a folder containing subfolders and documents is shared with a user, an access control policy is added for the folder as well as for each subfolder and document in the folder. While this approach can be adequate for single-user desktop systems, small user groups, and other simplified systems, in large-scale systems with many users, propagating access control policies to lower levels in a hierarchy is computationally expensive and can cause race conditions, uncertain states, and other problems.

DETAILED DESCRIPTION

The examples described herein provide a simplified, efficient way to control access to shared computing resources. In the described examples, an access control policy is created and stored in association with only the computing resource being shared. A user's authorization to access a resource at a lower hierarchical level (e.g. a file in a shared folder) is determined on-demand in response to a request to access the resource. When an access request is received, access control policies for the levels of a hierarchy higher than the resource are gathered and used to determine an effective access control list for the resource. Access can then be granted or denied based on the effective access control list.

This "lazy evaluation" of user authorization to access a resource avoids the computational cost of propagating access control policies down to all files and subfolders at lower levels of a hierarchy, as typically occurs in conventional systems. The described examples also reduce the occurrence of unstable states and race conditions that can occur in conventional systems when multiple users nearly simultaneously share folders at different levels in the hierarchy and these policies are propagated down the hierarchy. Examples are described below with reference to FIGS. 1-8.

Figure 1:
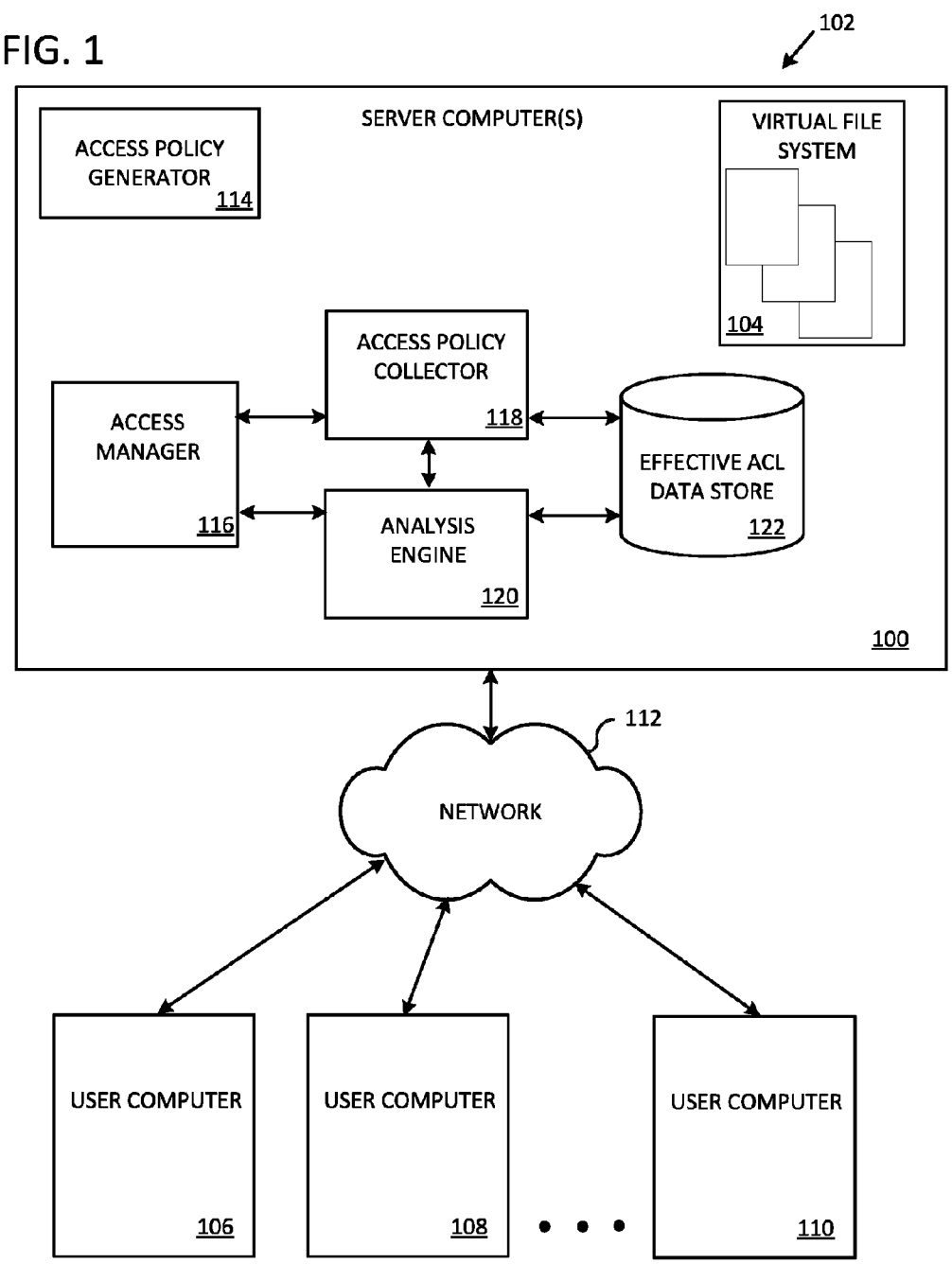
FIG. 1 is an example hierarchical policy-based access control system.

FIG. 1 illustrates one or more server computers 100 implementing an access control system 102. System 102 includes a virtual file system 104. Virtual file system 104 organizes computing resources, such as files and file folders, in a computing resource hierarchy, where each computing resource has a hierarchy level. Virtual file system 104 is accessible to a plurality of different users such as user computers 106, 108, and 110. Users can be individuals, entities, or groups. User computers 106, 108, and 110 are in communication with virtual file system 104 via network 112. Network 112 can be the Internet, a Local Area Network (LAN), a Wireless Local Area Network (WLAN), a Wide Area Network (WAN), or other type of network, wired or wireless. In some examples, virtual file system 104 is accessed through a web service (not shown) such as a document collaboration or document sharing web service.

System 102 includes an access policy generator 114 that establishes access control policies for computing resources. In response to a request to share a target computing resource of virtual file system 104 with a user, access policy generator 114 creates an access control policy associated with the target computing resource. The access control policy specifies that the user is authorized to access the target computing resource. Upon creating the access control policy, access policy generator 114 stores the access control policy in association with the target computing resource but not in association with other computing resources at a lower hierarchy level than the hierarchy level of the target computing resource.

Access control policies (also referred to as access control entries) can have a variety of formats. Access control policies can specify a user or group of users (also referred to as principals), a computing resource, and one or more actions (also referred to as roles or permissions) that the user is allowed or is not allowed to perform. Example actions include: accessing the resource with read access; accessing the resource with write access; moving the resource; sharing the resource; viewing activity of the computing resource; adding comments to the computing resource; downloading; or emailing. Access control policies can be stored in virtual file system 104 in association with corresponding computing resources, in a separate data store (not shown), as metadata for a resource, or in other ways in association with a resource.

System 102 also includes an access manager 116 that receives a request from a user to access a computing resource of virtual file system 104. Access manager 116 determines whether to grant or deny the user access to the computing resource based at least in part on an effective access control list. The effective access control list is determined by an access policy collector 118 and an analysis engine 120.

Access policy collector 118 retrieves access control policies for one or more hierarchy levels in the computing resource hierarchy in virtual file system 104 that are above the hierarchy level of the computing resource for which an effective access control list is being determined. An example computing file folder hierarchy will be discussed with respect to FIG. 2. Analysis engine 120 determines the effective access control list corresponding to the computing resource based at least in part on permissions specified by the access control policies for the one or more hierarchy levels above the hierarchy level of the computing resource. That is, for a particular computing resource, access policy collector 118 "walks up" the hierarchy collecting access policies from hierarchically related resources, and analysis engine 120 determines which actions apply to the computing resource and determines the effective access control list that represents the actions allowed and/or not allowed by the user with respect to the resource. In this way, the effective access control list represents an effective propagation of access control policies of higher hierarchy levels to a computing resource. In some examples, analysis engine 120 determines which actions apply to both the user and the computing resource, and the effective access control list is user-specific. In other examples, the effective access control list is simply the access control policies collected by access policy collector 118.

System 102 also includes an effective access control list data store 122 that stores one or more previously determined effective access control lists. The respective previously determined effective access control lists correspond to at least one computing resource of the computing resource hierarchy. In some examples, access policy collector 118 retrieves a previously determined effective access control list from the effective access control list data store instead of collecting an access control policy. For example, if an effective access control list is stored in data store 122 for a folder two levels up the hierarchy from a file a user is attempting to access, access policy collector 118 can collect access policies for the hierarchy levels between the file and the folder two levels up and then retrieve the stored effective access control list for the remainder of the hierarchy. In some examples, effective access control list data store 122 is located in cache or is otherwise a temporary data store.

Figure 2:
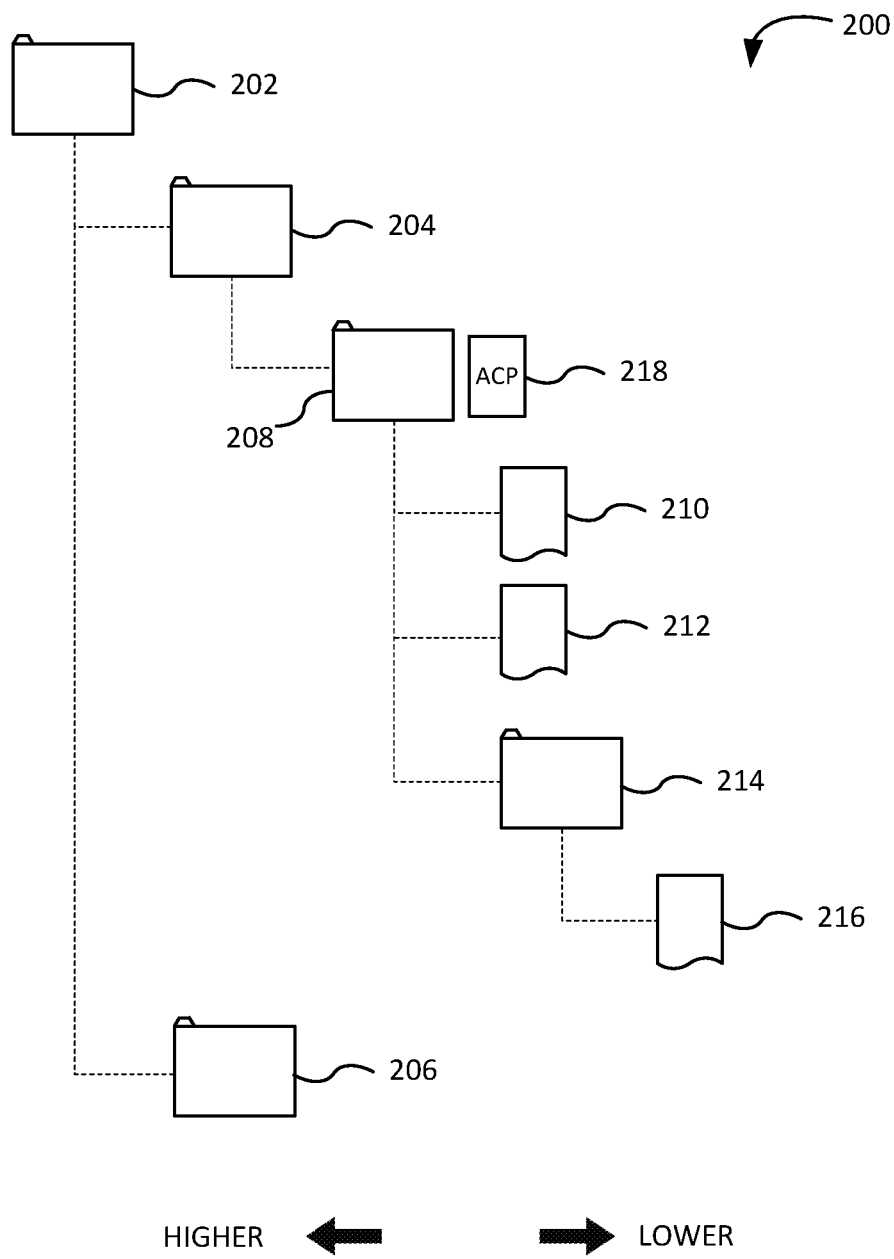
FIG. 2 is an example computing resource hierarchy in which an access control policy is stored in association with a file folder but not in association with subfolders and files within the file folder.

FIG. 2 illustrates an example file folder hierarchy 200. Hierarchy 200 can be used, for example, to organize the computing resources in virtual file system 104 of FIG. 1. Folder 202 is the "root" folder or highest folder in hierarchy 200. Folders 204 and 206 are one level lower in hierarchy 200. Folder 208 is another level lower than folder 204. Files 210 and 212, which can be documents or other files, are contained within folder 208. Files 210 and 212, as well as folder 214, are contained within folder 208. In FIG. 2, file 216, contained within folder 214, is at the lowest level in hierarchy 200.

Access control policy 218 is stored in association with folder 208. Access control policy 218 specifies actions that one or more users may take or functions the users may perform on folder 208. Although files 210, 212, and 216 and folder 214 are contained within folder 208 (and at a lower level in hierarchy 200 than folder 208), access control policy 218 is not associated with files 210, 212, or 216 or folder 214. When the user attempts to access, for example, file 216, an effective access control list is created that is based on access policies collected by "walking" up hierarchy 200. In this example, available access control policies stored in association with folders 214, 208, 204, and 202 are collected, and the effective access control list is based on these collected access control policies. Although folder 206 is at a higher level in hierarchy 200 than file 216, access control policies associated with folder 206 are not collected because folder 206 is not in a direct hierarchical relationship with file 216 (i.e., as a "parent" folder or subfolder).

FIG. 2 illustrates a file folder-based hierarchy, but other systems are also possible. In some examples, a group of files or documents can be arranged hierarchically without the use of folders. For example, a first file can be hierarchically linked to a second (or parent) file that is at a higher level. In other examples, users and groups of users can be arranged hierarchically. For example, an organization can be divided into groups and subgroups, each having a number of users. If a user attempts to perform a function on a computing resource, authorization can be determined based on an effective access control list for the user rather than for the resource. Similar to "walking" up the hierarchy of folders discussed with reference to FIG. 2, the authority of the user to perform the function on the resource is determined by gathering access control policies of the groups and subgroups of which the user is a member.

Figure 3:
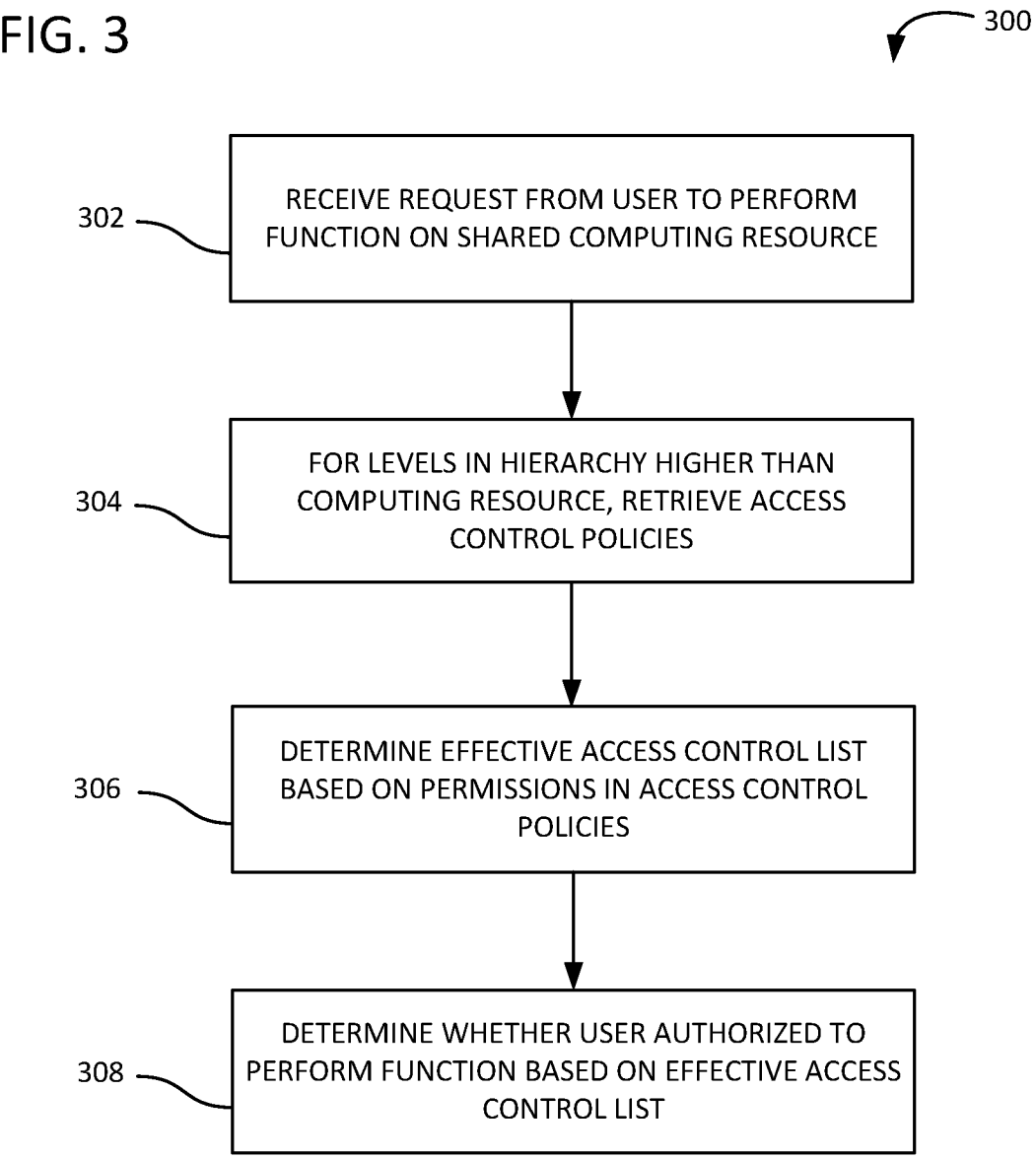
FIG. 3 is a flowchart of an example method for accessing shared computing resources.
Figure 4:
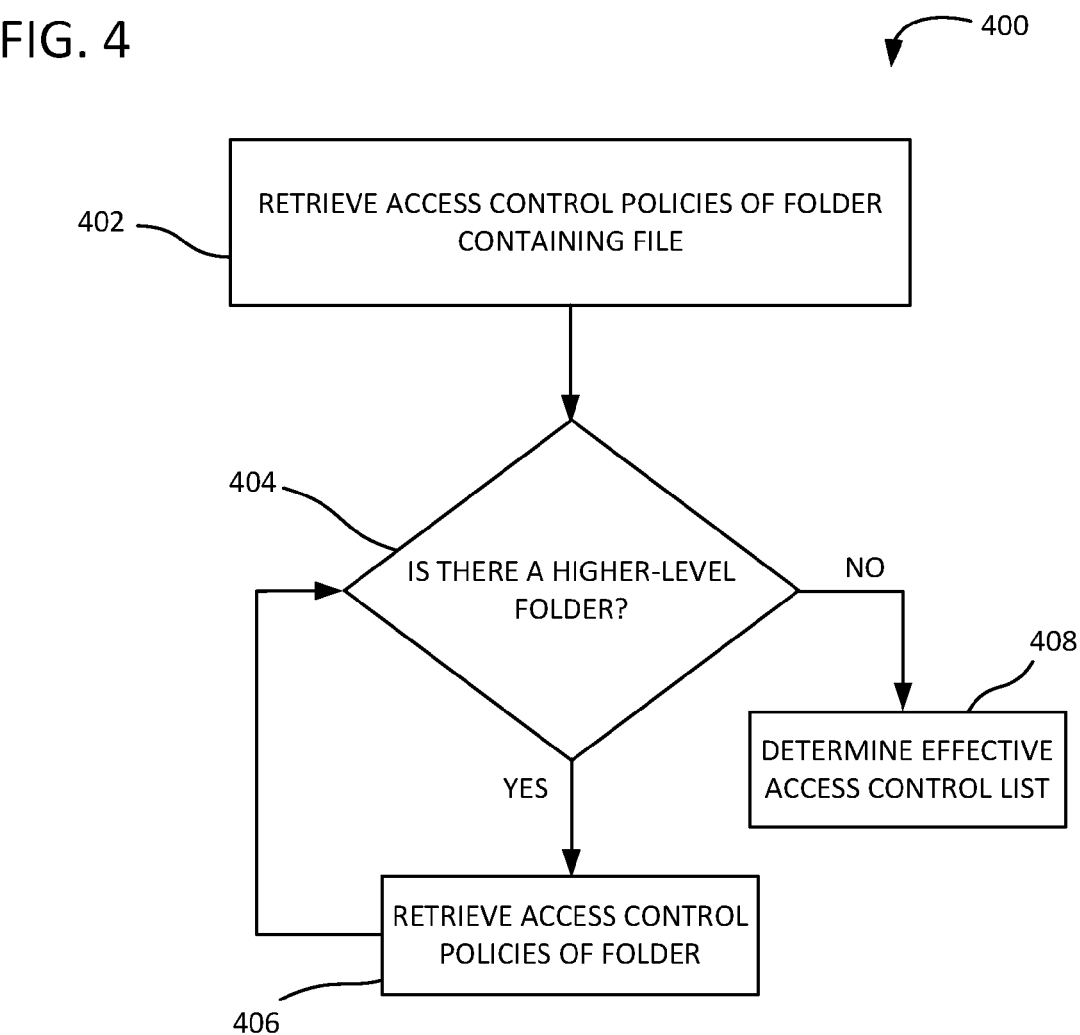
FIG. 4 is a flowchart of an example method for collecting access control policies from different hierarchical levels to determine an effective access control list.

FIG. 3 illustrates a method 300 of accessing shared computing resources in a hierarchical system. In process block 302, a request is received from a user to perform a function on a shared computing resource, the shared computing resource having a hierarchy level in a computing resource hierarchy. The function can be, for example, one or more of: accessing with read access, accessing with write access, moving the computing resource, sharing the computing resource, or viewing activity of the computing resource. The computing resource can be a file, such as a word processing document, text document, Portable Document Format (PDF) file, annotation file, audio file, or video file, or a file folder, for example.

For hierarchy levels in the computing resource hierarchy that are higher than the hierarchy level of the computing resource, one or more access control policies associated with the hierarchy levels are retrieved in process block 304. In some examples, access control policies are collected for all higher hierarchy levels up to and including a top level. This is illustrated by method 400 in FIG. 4.

In process block 402, an access control policy of a folder containing the computing resource is retrieved. In decision box 404, it is determined whether the hierarchy contains a higher-level folder. If not, an effective access control list is determined in process block 408 based on the collected access control policies. If there is a higher-level folder, then in process block 406 access control policies for the higher-level folder are retrieved. Whether the hierarchy contains another higher-level folder is then re-assessed in process block 404. Method 400 continues until access control policies for all hierarchy levels have been retrieved and an effective access control list has been determined.

Returning to FIG. 3, in some examples, all available access control policies for each level of a hierarchy are retrieved, even access control policies that relate to other users and not the user. In other examples, only access control policies that relate to the user are retrieved. Previously determined effective access control lists can be retrieved to substitute for access control policies for some or all levels of a hierarchy. For example, a previously determined effective access control list can be retrieved that corresponds to a computing resource higher in the computing resource hierarchy than the computing resource. In some examples, when a new access control policy has been established for a hierarchy level included in a stored effective access control list, the stored effective access control list is deleted or updated to ensure that current information is stored.

An effective access control list is determined in process block 306. The effective access control list is based at least in part on permissions specified in the one or more access control policies associated with the hierarchy levels that are higher than the hierarchy level of the computing resource. In some examples, the effective access control list is determined upon receipt of a request to perform a function on the computing resource. In such examples, effective access control lists are not determined for resources that are not accessed, avoiding a substantial computational expense. Computational expense is further reduced by relying on stored information. For example, if a user is accessing a large number of files in a folder, one after the other, the access control policies retrieved for the higher levels of the hierarchy can be recalled from storage, whether in the form of a stored effective access control list for the folder or in the form of the stored access control policies themselves that were used to determine the effective access control list.

In process block 308, it is determined whether the user is authorized to perform the function on the shared computing resource based at least in part on the effective access control list for the computing resource. In some examples, the effective access control list does not include a permission authorizing the user to perform the function. In such cases, it is determined in process block 308 that the user is not authorized to perform the function.

Figure 5:
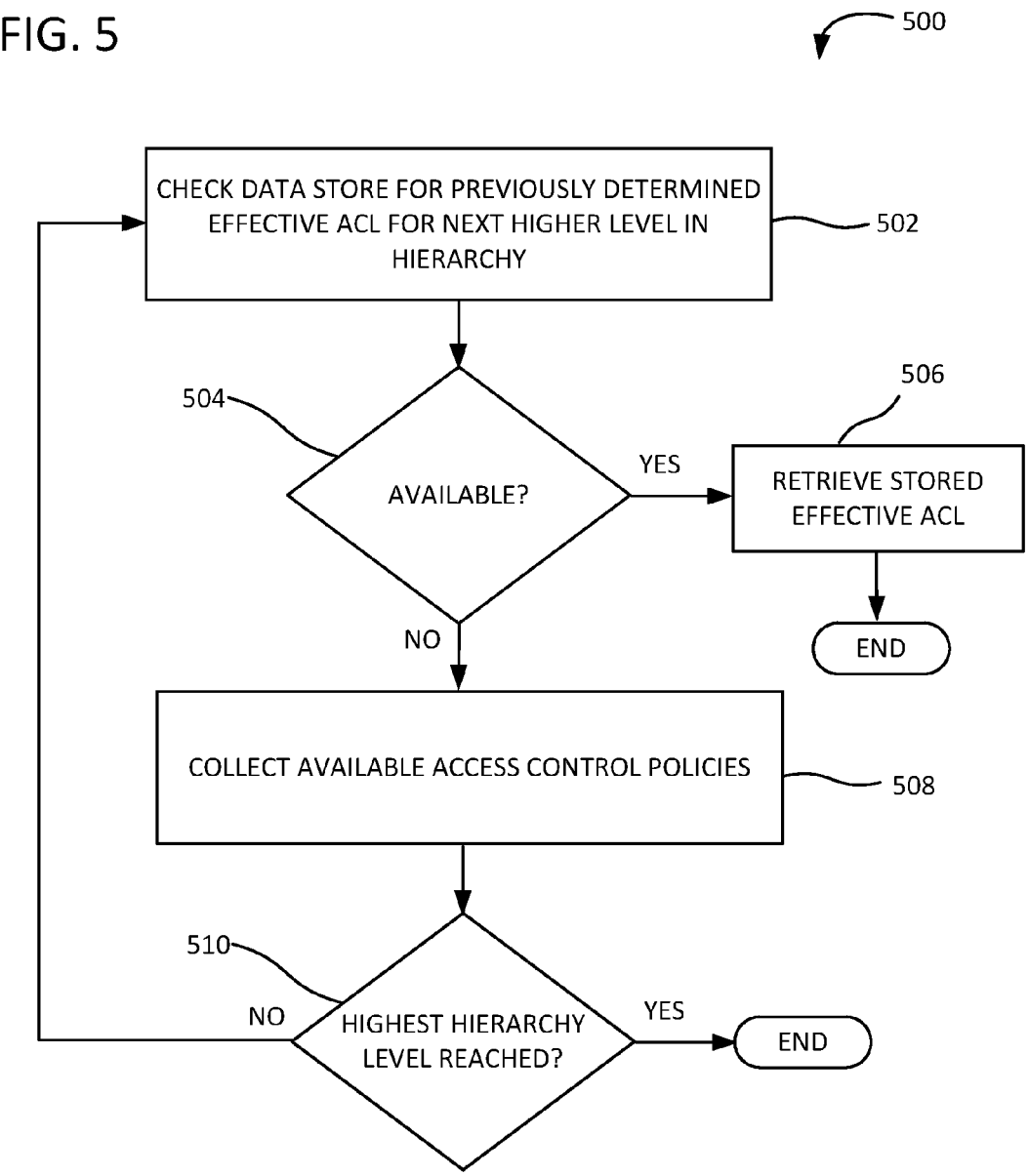
FIG. 5 is a flowchart of an example method of retrieving access control policies that includes checking a data store for previously determined effective access control lists.

FIG. 5 illustrates a method 500 of retrieving access control policies. In process block 502, a data store storing previously determined effective access control lists is checked to determine if an effective access control list is stored for the next higher level in a hierarchy. For example, when a user is attempting to access a file, it is determined whether an effective access control list is stored for the folder containing the file. The previously determined access control lists can be stored in a data store similar to effective access control list data store 122 of FIG. 1, which can be, for example, a temporary data store located in cache. In process block 504, it is determined if a stored effective access control list for the hierarchy level is available. If so, the stored effective access control list is retrieved in process block 506, and method 500 ends. In some examples, the stored effective access control list includes permissions found in access control policies for the remaining higher hierarchy levels, and retrieval of additional access control policies is not performed because additional information obtained is redundant.

If it is determined in process block 504 that a stored previously determined effective access control list is not available, available access control policies for the hierarchy level are retrieved in process block 508. In process block 510, it is determined whether the highest level in the hierarchy has been reached. If so, method 500 ends. If not, the data store is checked for stored effective access control lists for the next level in the hierarchy in process block 502. Method 500 continues until either a stored effective access control list has been retrieved or until available access control policies for all levels in the hierarchy have been retrieved.

In some examples, an effective access control list data store is checked for stored effective access control lists corresponding to multiple levels of a hierarchy above a resource on which a user is attempting to perform a function, and if a stored list is not found, collection of available access control policies for the higher levels of the hierarchy is performed.

Figure 6:
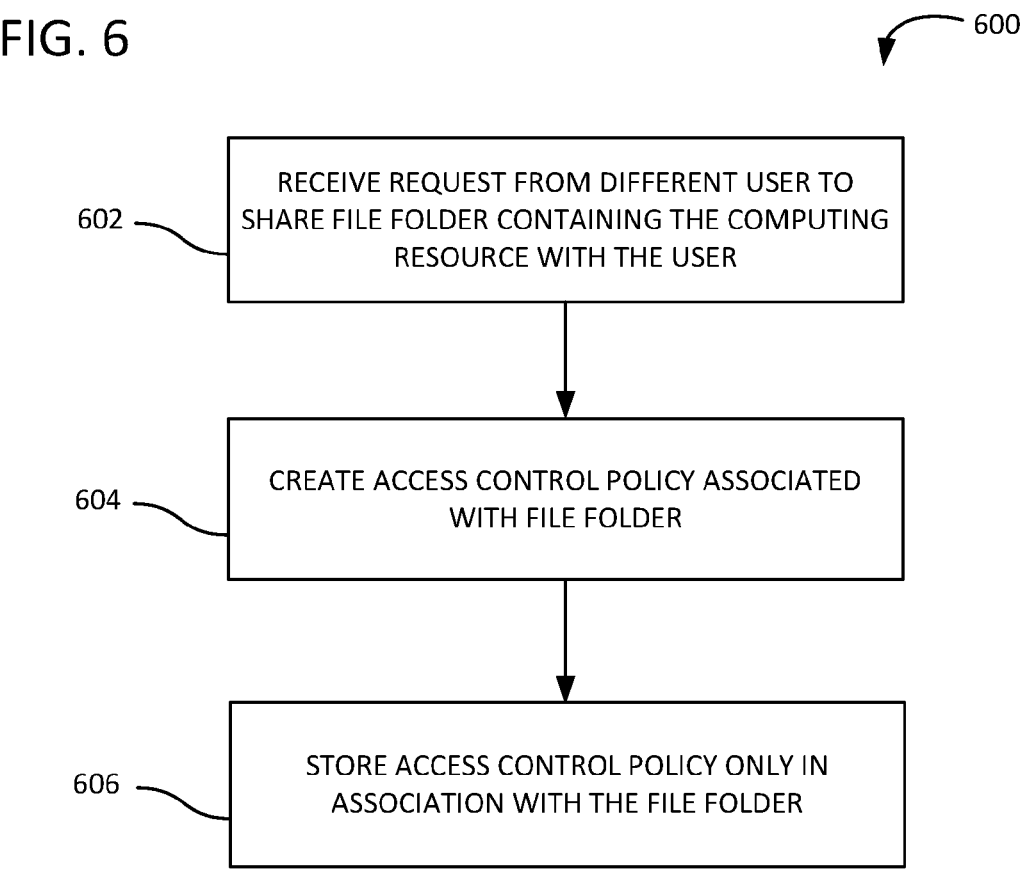
FIG. 6 is a flowchart of an example method for storing an access control policy only in association with a resource that is shared.

FIG. 6 illustrates a method 600 that can be performed separately or in conjunction with method 300 of FIG. 3. In process block 602, a request is received from a different user to share a file folder containing the computing resource with the user. In process block 604, an access control policy associated with the file folder is created, the access control policy specifying that the user is authorized to access the file folder. Upon creating the access control policy, the access control policy is stored only in association with the file folder in process block 606.

Figure 7:
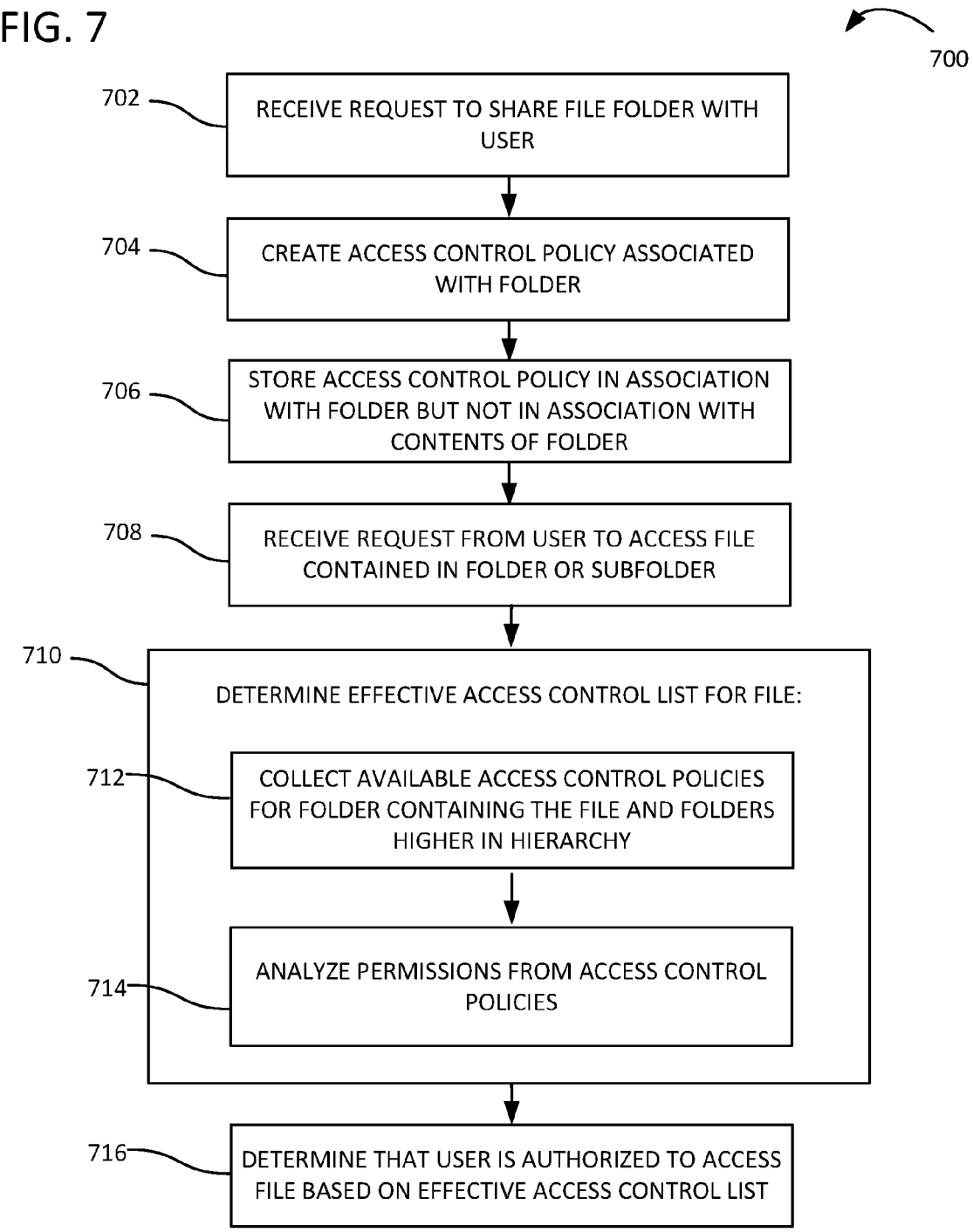
FIG. 7 is a flowchart of an example method of accessing a shared file in which an access control policy is established at the hierarchy level of a file folder higher in a hierarchy than the file, and a determination of whether a user is authorized to access the file is made by collecting access control policies for levels in the hierarchy higher than the file.

FIG. 7 illustrates a method 700 of accessing shared computing resources in a hierarchical system. In process block 702, a request to share a file folder with a user is received. In process block 704, an access control policy associated with the file folder is created. The access control policy specifies that the user is authorized to access the file folder. Upon creating the access control policy, the access control policy is stored, in process block 706, in association with the file folder but not in association with either individual files contained in the file folder or other file folders contained within the file folder. A request from the user to access a file that is either contained within the file folder or contained within a file folder that is lower in a computing file folder hierarchy than the file folder is received in process block 708. An effective access control list for the file is determined in process block 710 by sub-process blocks 712 and 714. In sub-process block 712, available access control policies are collected for a file folder containing the file and for one or more file folders that are higher in the computing file folder hierarchy than the file folder containing the file. In sub-process block 714, the permissions specified in the collected access control policies are analyzed. Based on the effective access control list, in process block 716 it is determined that the user is authorized to access the file.

Examples of Computing Environments

Figure 8:
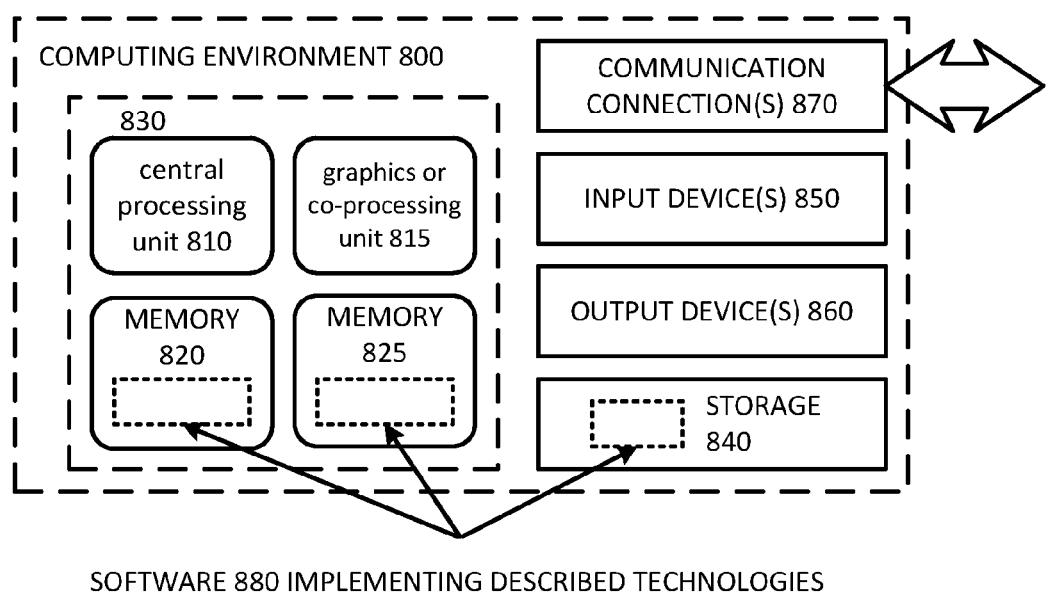
FIG. 8 is a generalized computing environment in which the described examples can be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, media player, gaming system, mobile device, etc.)

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more examples described herein, in the form of computer-executable instructions suitable for execution by the processing unit(s). For example, memory 820 and 825 and software 880 can store computer-executable instructions for performing hierarchical policy-based shared resource access control.

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information and which can be accessed within the computing environment 800. The storage 840 stores instructions for the software 880 implementing one or more innovations described herein. For example, software 880 can implement access policy generator 114, access manager 116, access policy collector 118, and analysis engine 120 of FIG. 1.

The input device(s) 850 may be a touch input device such as a keyboard, mouse, pen, or trackball, a voice input device, a scanning device, or another device that provides input to the computing environment 800. For video encoding, the input device(s) 850 may be a camera, video card, TV tuner card, or similar device that accepts video input in analog or digital form, or a CD-ROM or CD-RW that reads video samples into the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or nonvolatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A computer-implemented method of accessing shared computing resources, the method comprising:

receiving a request to access a computing resource in a computing resource hierarchy stored in a memory or storage of a computing device;
generating, by operations carried out by one or more processors, an effective access control list for the computing resource, wherein generating the effective access control list comprises:
collecting available access control policies for one or more parent computing resources of the computing resource in the computing resource hierarchy, and
analyzing the permissions specified in the collected access control policies to generate the effective access control list, wherein the analyzing comprises propagating the permissions specified in the available access control policies for the one or more parent computing resources and storing the propagated permissions in the effective access control list;
determining, based at least in part on the generated effective access control list for the computing resource, whether to grant the requested access to the computing resource;
receiving a subsequent request to access the computing resource;
identifying the generated effective access control list associated with the computing resource; and
determining, based at least in part on the generated effective access control list, whether to grant the subsequent requested access to the computing resource, wherein the determining comprises analyzing the propagated permissions for the one or more parent computing resources in the generated effective access control list.

2. The computer-implemented method of claim 1, wherein the request and the subsequent request are received from one or more user computers over a network.

3. The computer-implemented method of claim 1, wherein the computing resource hierarchy is accessed through a web service.

4. The computer-implemented method of claim 1, wherein the computing resource is a file and the computing resource hierarchy comprises a virtual file system.

5. The computer-implemented method of claim 1, wherein:
the request to access the computing resource identifies a user for which access is requested;
collecting the available access control policies for the one or more parent computing resources comprises collecting access control policies that are associated with the identified user; and
the method further comprises storing the generated effective access control list in association with the computing resource and the identified user.

6. The computer-implemented method of claim 1, further comprising:
detecting that a new access control policy has been established for one of the one or more parent computing resources; and
deleting the generated effective access control list associated with the computing resource.

7. One or more non-transitory computer-readable storage media storing computer-executable instructions that, when executed by one or more processors, perform operations, the operations comprising:
receiving a request to perform a function on a particular computing resource, wherein the computing resource is contained within a hierarchy level in a computing resource hierarchy;
retrieving one or more access control policies associated with one or more parent computing resources of the particular computing resource, wherein the one or more parent computing resources are contained within hierarchy levels in the computing resource hierarchy that are higher than the hierarchy level containing the particular computing resource;
determining an effective access control list for the particular computing resource, wherein the effective access control list comprises a propagation of permissions associated with the retrieved one or more access control policies;
determining whether the request to perform the function on the particular computing resource is authorized based on the effective access control list for the particular computing resource;
receiving another request to perform the function; and
determining whether the another request is authorized using the effective access control list for the particular computing resource, wherein the determining comprises analyzing the propagation of permissions in the effective access control list.

8. The one or more non-transitory computer-readable storage media of claim 7, wherein the request and the another request to perform the function on the particular computing resource are received from one or more user computers via a network.

9. The one or more non-transitory computer-readable storage media of claim 7, wherein:
the computing resource hierarchy is part of a virtual file system; and
retrieving the one or more access control policies associated with the one or more parent computing resources of the particular computing resource comprises accessing the virtual file system through a web service.

10. The one or more non-transitory computer-readable storage media of claim 9, wherein the function is at least one of: accessing the particular computing resource with read access; accessing the particular computing resource with write access; moving the particular computing resource; sharing the particular computing resource; viewing activity of the particular computing resource; adding comments to the particular computing resource; or downloading the particular computing resource.

11. The one or more non-transitory computer-readable storage media of claim 7, wherein the one or more parent computing resources comprise:
a first parent computing resource that is in a hierarchy level above the hierarchy level of the particular computing resource and is in a direct hierarchical relationship with the particular computing resource; and
a second parent computing resource that is in another hierarchy level above the hierarchy level of the first parent computing resource and is in a direct hierarchical relationship with the first parent computing resource.

12. The one or more non-transitory computer-readable storage media of claim 7, wherein the effective access control list represents an effective propagation of the one or more access control policies associated with one or more parent computing resources to the particular computing resource.

13. The one or more non-transitory computer-readable storage media of claim 7, wherein the operations further comprise:

detecting a change to one of the one or more access control policies associated with the one or more parent computing resources; and deleting the effective access control policy for the particular computing resource.

14. The one or more non-transitory computer-readable storage media of claim 7, wherein retrieving the one or more access control policies associated with the one or more parent computing resources comprises:

searching for a previously determined effective access control list associated with a first parent computing resource of the particular computing resource;

if the first parent computing resource is associated with a previously determined effective access control list, retrieving the previously determined effective access control list; and otherwise, retrieving an access control policy for the first parent computing resource and repeating the searching for a previously determined effective access control list for a second parent computing resource, wherein the second parent computing resource is a parent of the first parent computing resource.

15. The one or more non-transitory computer-readable storage media of claim 7, wherein:

the operations further comprise identifying a user associated with the request to perform the function on the particular computing resource; and wherein retrieving the access control policies associated with one or more parent computing resources comprises retrieving access control policies related to the identified user.

16. The one or more non-transitory computer-readable storage media of claim 15, wherein:

the operations further comprise examining an organization hierarchy comprising groups and sub-groups of users; and wherein retrieving the access control policies associated with one or more parent computing resources further comprises retrieving access control policies related to one or more of the groups and/or sub-groups in the organization hierarchy of which the identified user is a member.

17. The one or more non-transitory computer-readable storage media of claim 7, wherein retrieving the one or more access control policies associated with the one or more parent computing resources comprises:

retrieving access control policies for parent computing resources that are contained within hierarchy levels in the computing resource hierarchy that are higher than the hierarchy level containing the particular computing resource and lower than or equal to a top hierarchy level of the computing resource hierarchy.

18. One or more server computers implementing an access control system, the system comprising:

one or more processors;

one or more memories;

a computing resource hierarchy comprising computing resources in multiple hierarchy levels;

an access policy collector that:
retrieves, using at least one of the one or more processors, access control policies for one or more parent computing resources in hierarchy levels in the computing resource hierarchy that are above a hierarchy level of a target computing resource; and retrieves, using at least one of the one or more processors, a previously determined access control list for a particular parent computing resource if a previously determined effective access control list exists;

an analysis engine that:
determines, using at least one of the one or more processors, an effective access control list for the target computing resource, wherein the effective access control list comprises a propagation of permissions specified by the access control policies retrieved by the access policy collector, including one or more permissions specified in the previously determined effective access control list for the particular parent computing resource; and an access manager that:
receives, using at least one of the one or more processors, an access request for a user to access a target computing resource in the computing resource hierarchy; and determines, using at least one of the one or more processors, whether to grant or deny the user access to the target computing resource based, at least in part, on the effective access control list, wherein the determining comprises analyzing the propagation of permissions in the effective access control list.

19. The system of claim 18, wherein the access manager is configured to receive the access request from a user computer via a computer network.

20. The system of claim 18, further comprising a data store storing one or more previously determined effective access control lists corresponding to at least one computing resource of the computing resource hierarchy.

* * * * *